June 18, 1968   D. R. MARKHAM   3,388,538
HARVESTING APPARATUS

Filed June 9, 1965   5 Sheets-Sheet 2

INVENTOR.
D. R. MARKHAM

INVENTOR.
D. R. MARKHAM

United States Patent Office 3,388,538
Patented June 18, 1968

3,388,538
HARVESTING APPARATUS
David R. Markham, Ottumwa, Iowa, assignor to Deere & Company, Moline, Ill., a corporation of Delaware
Filed June 9, 1965, Ser. No. 462,569
9 Claims. (Cl. 56—98)

ABSTRACT OF THE DISCLOSURE

A pull-type ensilage harvester having a detachable forwardly disposed single row crop harvesting unit including a plurality of forwardly and downwardly extending gathering members which define at least one fore-and-aft crop-receiving passage, and a pair of forwardly diverging guide members disposed above the outside gathering members. A reciprocating cutter is mounted below each passage for severing the crop from the field, and a rotating upright roller extends upwardly from the rearward end of at least one of the outside gathering members to facilitate the rearward movement of crops draped over the gathering member.

---

This invention relates to an agricultural crop handling machine and more particularly to an improved harvesting unit for collecting row planted stalk crops from the fields and adapted for use on a crop treating machine, such as a forage harvester or the like.

A typical forage harvester, operating in a row planted stalk crops, such as corn or the like, includes a row crop harvesting unit for collecting the crop as the machine advances over the field, a rotary cutter for reducing the crop, and means for discharging the reduced crop to a receptacle, conventionally a trailing wagon. A row crop harvesting unit conventionally includes laterally spaced members forming one or more fore-and-aft passageways, each passageway receiving the stalks in one row as the machine advances, a cutting mechanism for severing the stalks a short distance from the ground, and gathering chains for conveying the severed crop rearwardly.

At the time of harvest, the row crops are frequently in a downed and tangled condition because of wind or other damage. In such a case, the crop is lifted and separated by the fore-and-aft members which move between the rows. However, previous harvesting units have experienced some difficulty in gathering such downed crops, the crops often being pulled from the gathering chains.

According to the present invention, a novel design of the fore-and-aft members is provided for raising and separating down crops without pulling the crops from the gathering chains. More specifically, the members are designed so that the distance between the gathering chains and the top of the fore-and-aft members, along which the downed stalks slide, decreases as the stalks move rearwardly on the harvesting unit, reducing the pull on the stalks.

Another object is to provide such fore-and-aft members with a floating forward portion supported close to the ground for lifting downed crops, the forward portion being free to raise upon striking an obstruction, and further to provide adjusting means whereby the distance the forward portion is supported above the ground can be varied.

Another object is to provide an upright roll extending upwardly from a rear part of the fore-and-aft member and around which the downed stalks are pulled, reducing the sliding friction between the stalks and the fore-and-aft member which tends to pull the stalks from the gathering chains, and further to provide such a roll which can be either free wheeling or rotated to positively move the stalks around the rear portion of the fore-and-aft member.

Another object is to provide such a harvesting unit with novel means for guiding the upper portion of upright stalks while the stalks are engaged by the gathering chains and for disposing the stalks in a generally horizontal, fore-and-aft position for longitudinal feeding into the cutting means, and further to provide means on the upper stalk control for preventing the stripping of corn ears or the like from the stalks, reducing the number of ears which fall by the wayside.

Another object is to provide a stalk severing mechanism which does not interfere with the rearward movement of the severed stalks by the gathering chains, and more specifically to provide a cutting mechanism having a reciprocating knife located below and registering with a stationary knife, and a drive mechanism for the reciprocating knife also located below the stationary knife in order that the cutting mechanism does not interfere with the rearward movement of the butt end of the severed stalk.

Still another object is to provide such an improved harvesting unit of simple and rugged construction, inexpensive to manufacture and maintain.

These and other objects will become apparent from a consideration of the following detailed description and accompanying drawings wherein.

Figure 1:
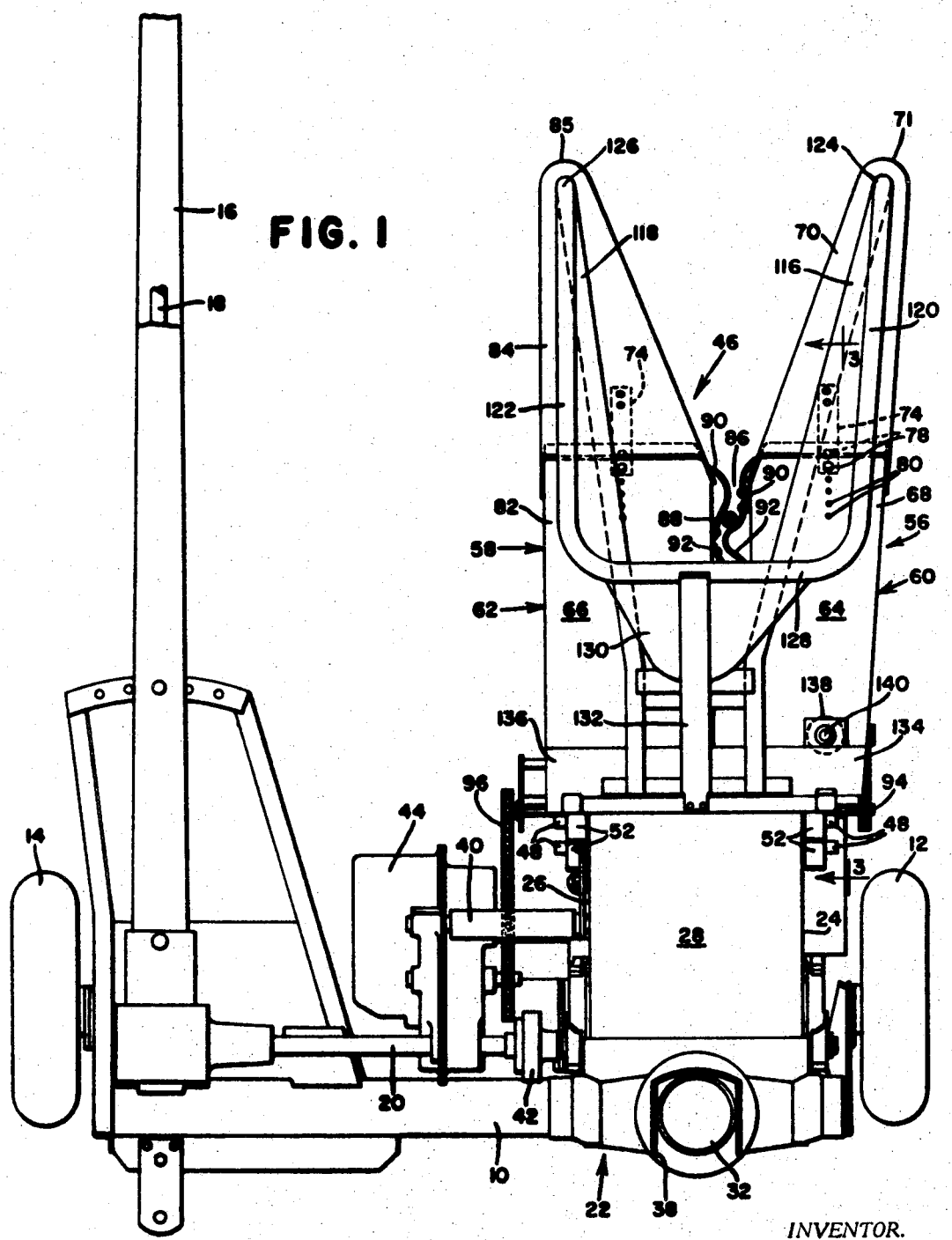
FIG. 1 is a plan view of a forage harvester including a single row crop harvesting unit.
Figure 2:
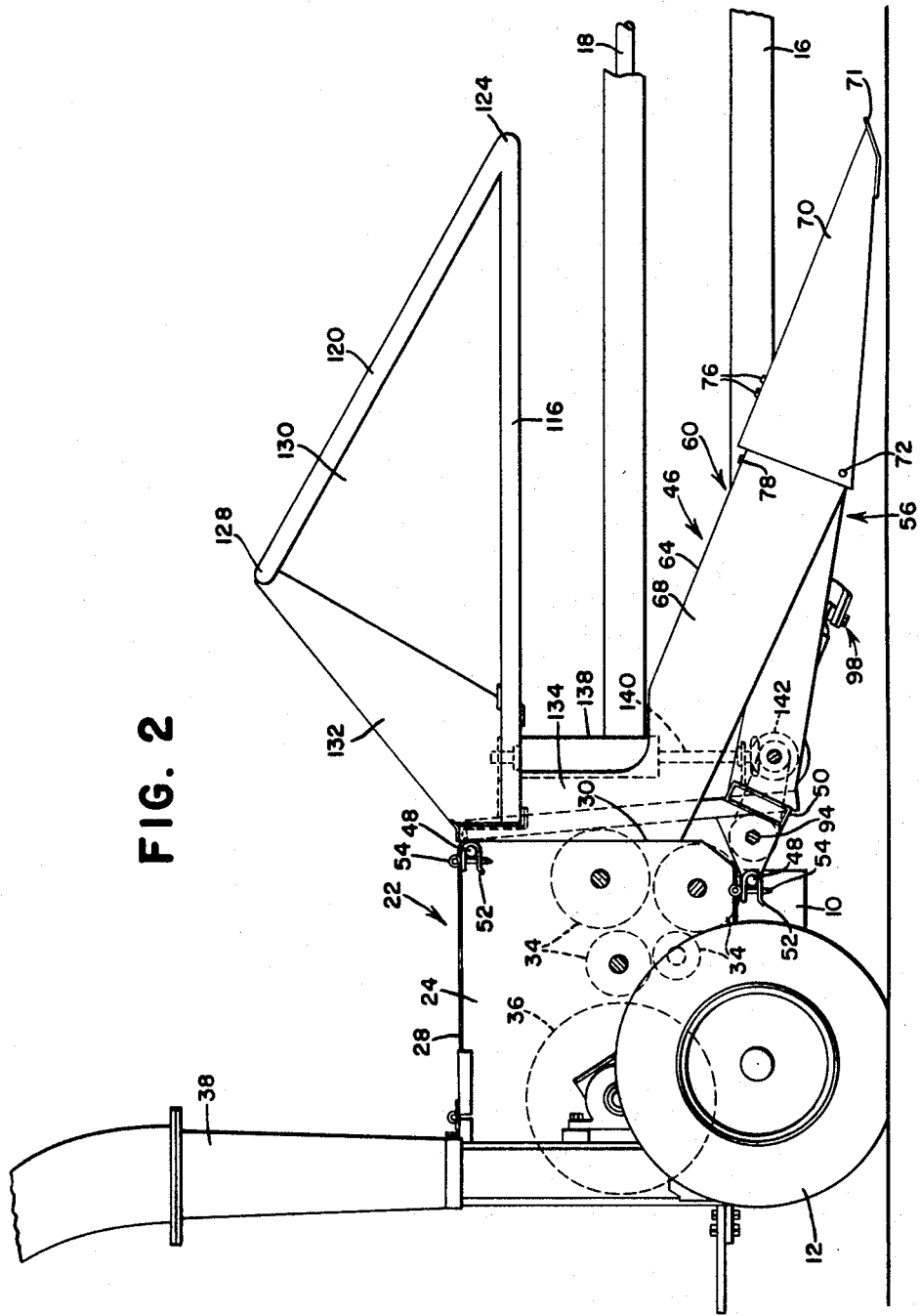
FIG. 2 is a partly schematic, side elevation view of the harvester shown in FIG. 1.

The forage harvester, shown in FIGS. 1 and 2, includes a mobile main frame 10 mounted on right and left wheels 12 and 14, a forwardly extending draft member 16 connectible to a tractor (not shown), and a fore-and-aft drive shaft 18 over the draft member 16 and connectible at its forward end to a tractor power take-off (not shown) and at its rear end to a transverse drive shaft 20.

A substantially closed cutter housing 22 is mounted on the frame and includes opposite sides 24 and 26, a top 28, a forward inlet 30, and an upwardly directed outlet 32. A plurality of transverse feed rolls 34 are mounted within the housing 22 for moving the crop from the inlet 30 to an axially transverse rotary cutter 36, which reduces the crop and impels it upwardly through the outlet 32 and through a discharge spout 38 mounted on the outlet 32 for directing the material to a receptacle, such as a trailing wagon (not shown). The feed rolls 34 and rotary cutter 36 are shown schematically in FIG. 2 and are driven by a feed roll drive 40 and a cutter drive 42 rotated by the drive shaft 20 through a transmission 44.

Figure 3:
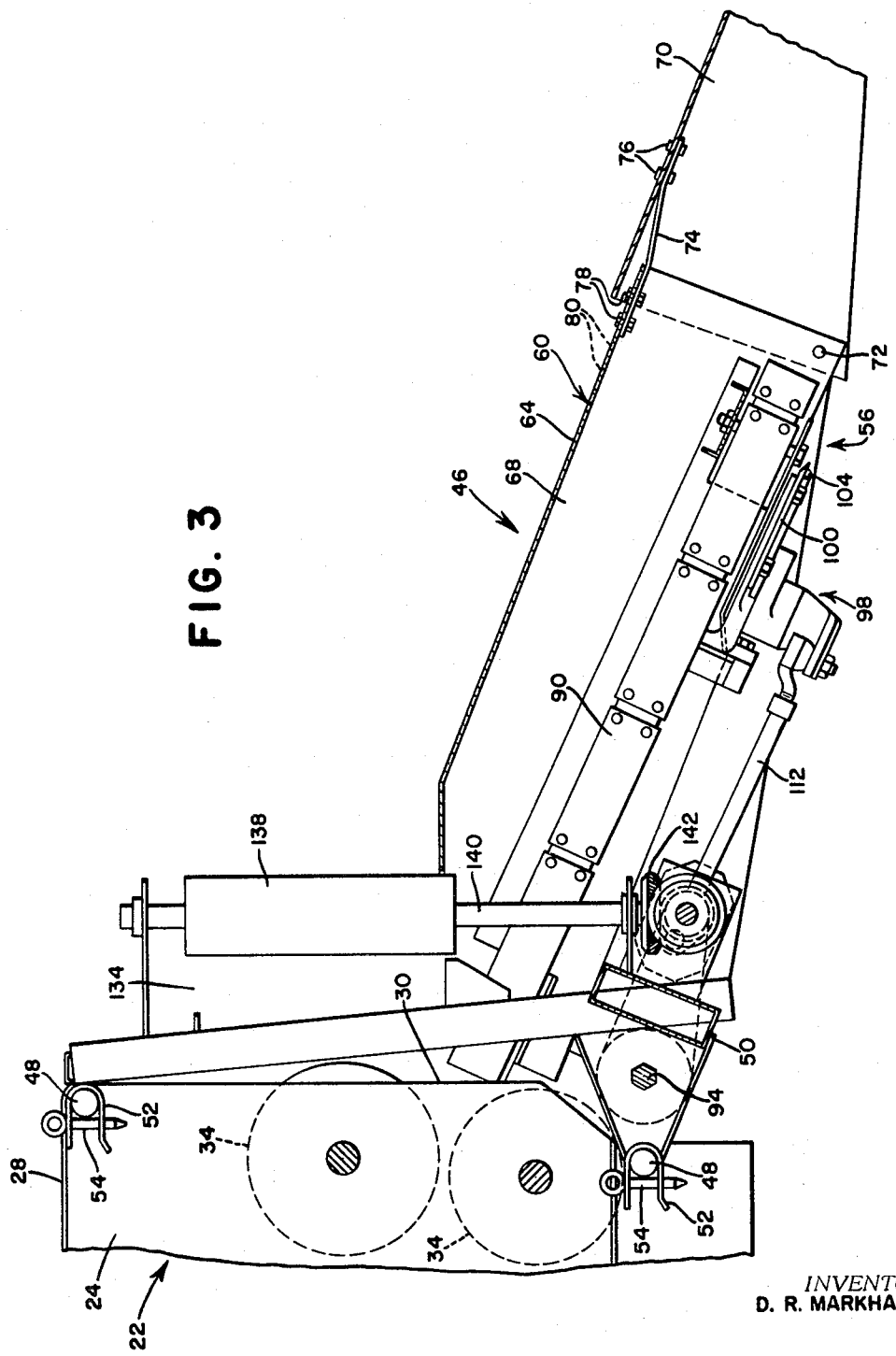
FIG. 3 is an enlarged section of the harvesting unit generally along the lines 3—3 of FIG. 1, omitting the upper and the forward portions of the harvesting unit.

A row crop harvesting unit, indicated generally by the numeral 46, is detachably mounted on a plurality of attachment points 48 carried by the frame 10, the harvesting unit extending forwardly from the frame 10 for collecting row planted stalk crops from the field and moving them rearwardly through the inlet 30 to the feed rolls 34. The harvesting unit 46 shown in FIGS. 1, 2, and 3 is a single row type and includes a frame 50 having a plurality of clevises 52 mounted on the attachment points 48 and secured thereon by removable pins 54. The harvesting unit 46 also includes right and left laterally spaced foreand-aft members 56 and 58, extending forwardly from the frame 50 and respectively including forwardly diverging right and left fenders 60 and 62, having relatively smooth upwardly and rearwardly inclined top surfaces 64 and 66. The right fender 60 includes a rear portion 68 and a forward extension portion 70, which forms a free forward end or tip 71, the forward portion being swingably mounted on a transverse pivot 72 carried by the rear portion 68 for rocking in a limited vertical arc between a lowered position proximate to the ground, as shown in FIG. 2, and a raised position providing a greater ground clearance.

The forward fender portion 70 is supported in the lowered position by a flexible member 74 connected to the forward portion 70 by fasteners 76 and to the rear fender portion 68 by fasteners 78, extending through alternate apertures 80 in the rear portion, whereby the supported height of the forward portion can be raised. If the forward portion 70 strikes a hummock or similar obstruction, the flexible member will bend allowing the forward portion 70 to raise about the pivot 72 to clear the obstruction.

The left fender 62 similarly includes a rear portion 82 and a forward extension portion 84, forming a free forward end or tip 85 and pivotally carried by the rear portion 82 for swinging between a raised and lowered position. The forward portion 84 is also adjustably supported in its lowered position by a flexible member 74 interconnecting the rear and forward fender portions 82 and 84.

The fore-and-aft members 56 and 58 are laterally spaced to form a generally fore-and-aft passageway 86 having a front inlet and rear outlet and accommodating the stalks of row planted crops as the machine advances over the field with the tips 71 and 85, spaced apart wider than the width of the passageway 86, moving between the rows, and converging toward the passageway front inlet for directing the stalks into the passageway 86. A pair of endless gathering chains 90 are mounted on the fore-and-aft members 56 and 58, each gathering chain having an elongated inner run along opposite sides of the passageway 86, the inner run 92 along opposite sides of the passageway 86, the inner run 92 engaging the stalks and moving them rearwardly along the passageway 86. A typical stalk 88 is shown engaged by the gathering chains 90 in FIG. 1. The gathering chains are connected to and driven by a transverse attachment drive shaft 94, rotated by an attachment drive 96 which, in turn, is driven by the drive shaft 20 through the transmission 44.

Figure 5:
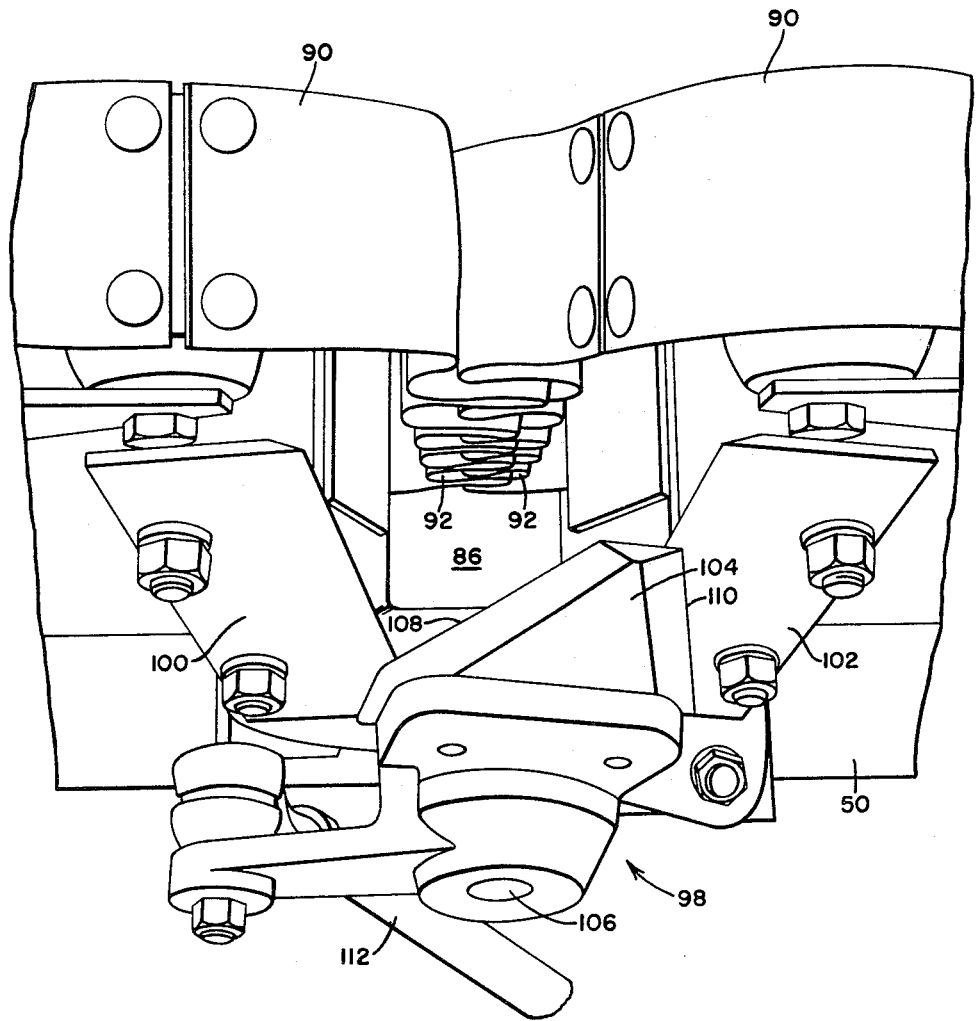
FIG. 5 is a perspective front and bottom view of the cutting mechanism and a portion of the gathering chains.

A cutting mechanism 98 is carried by the fore-and-aft members 56 and 58 adjacent to the front inlet of the passageway 86 for severing the stalks close to the ground as they are engaged by the gathering chains 90. As best seen in FIG. 5, the cutting mechanism 98 includes a pair of generally fore-and-aft, opposite, stationary knives 100 and 102 on opposite sides of the passageway 86, a triangular movable knife 104 mounted for angular reciprocating motion on an upright pivot 106 carried by the frame 50 and including knife edges 108 and 110 which respectively register with the stationary knives 100 and 102 as the movable knife reciprocates, and a pitman type cutting mechanism drive 112, driven by the attachment drive shaft 94 and connected to the movable knife for reciprocating the movable knife.

Since the movable knife 104 and drive mechanism 112 are below the stationary knives 100 and 102, it is not necessary for the butt of the severed stalk to ride over any part of the cutting mechanism 98 as the stalks move rearwardly along the passageway 86.

An upper stalk control structure extends forwardly from a portion of the frame 50 rearwardly of the cutting means 98 and is spaced above the fore-and-aft members 56 and 58, as shown in FIGS. 1 and 2, and includes a pair of elongated generally horizontal tubular guide members 116 and 118 diverging forwardly from the frame 50 on opposite sides of the passageway 86, a pair of inclined members 120 and 122 respectively extending upwardly and rearwardly from the forward ends of the guide members 116 and 118 and forming vertices or free terminal front ends 124 and 126 above and substantially vertically aligned respectively with the tips 71 and 85, and a transverse member 128 interconnecting the rear ends of the inclined members and extending above and across the passageway 86. An arcuate forwardly facing panel 130 has a top edge coextensive with and attached to the inclined members 120 and 122 and the transverse members 128 and a bottom edge attached to the guide members 116 and 118, substantially closing the fore-and-aft vertical area between each guide member and inclined member and the transverse vertical area below the transverse member and above the guide members. An upwardly forwardly inclined support member 132 extends between the transverse member 128 and the frame 50 behind the panel 130.

When the crop stalks are substantially upright, the vertices 124 and 126 move between the rows, separating the upper portions of the stalks in the adjacent rows. The guide members 116 and 118 maintain the stalks in a generally upright position as they are engaged by the gathering chains 90 and severed by the cutting mechanism 98. As the gathering chains 90 move the lower portion of the stalks rearwardly along the passageway 86, the upper portion of the stalks engage the transverse member 128 which prevents further rearward movement of the upper portions of the stalks. Additional rearward movement of the lower part of the stalks swings the stalks into a generally fore-and-aft position, the feed rolls 34 then engaging the butt ends of the stalks and feeding them into the rotary cutter 36. The panel 130 prevents corn ears, or the like, carried by the stalks, from striking the tubular members, thereby decreasing the number of ears stripped from the stalk when the stalks are engaged by the control structure.

When the crops are in a down and tangled condition, the fore-and-aft members 56 and 58 move between the rows, the stalks being engaged by the fenders 60 and 62 and sliding upwardly and rearwardly along the inclined top surfaces 64 and 66 of the respective fenders 60 and 62. After a stalk is engaged by the gathering chains 90 and severed from the field by the cutting mechanism 98, the butt of the stalk is moved upwardly and rearwardly by the gathering chains 90. Since the distance between the gathering chains 90 and the top surfaces 64 and 66 decreases rearwardly, as best seen in FIG. 3, the upward movement of the stalk along the top surfaces 64 and 66 does not exert an upward pull on the butt of the stalk which would tend to pull the stalk from the gathering chains.

As best seen in FIG. 1, the transverse dimension of the rear portion 68 of the right fender 60 decreases rearwardly to further reduce the pull on down crops which would tend to pull the stalks from the gathering chains 90, the right fender 60 conventionally being adjacent the standing crops.

Each fore-and-aft member 56 and 58 includes a generally upright abutment 134 and 136 at its rear end. A generally upright roller 138 extends upwardly from the fore-and-aft member 56 immediately ahead of the abutment 134 and includes an axial shaft 140 journaled on the frame 50. The roller 138 may be either smooth, as shown in the drawings, or fluted and may be either free wheeling or driven, as shown in the drawings, with the forward surface of the roller moving inwardly toward the passageway 86, the roller 138 being driven by a drive means 142 connected to the shaft 140 and rotated by the attachment drive shaft 94.

The roller 138 is preferably mounted above the right fore-and-aft member 56 which moves adjacent to the standing crop, although such a roller could be mounted on both fore-and-aft members within the scope of the invention.

As the downed stalks reach the rear end of the fore-and-aft member 56, they are positively moved around the abutment 134 by the roller 138, when the roller is driven, or they are pulled around the abutment by the gathering chains with a minimum amount of friction, when the roller 138 is of the free wheeling type. In either case, the friction between the stalks and the abutment 134 is substantially eliminated, reducing the number of stalks pulled from the gathering chains 90. The forward edge of the abutment 134 is closely associated with the roller 138 to eliminate wrapping of the crop around the roller.

Figure 4:
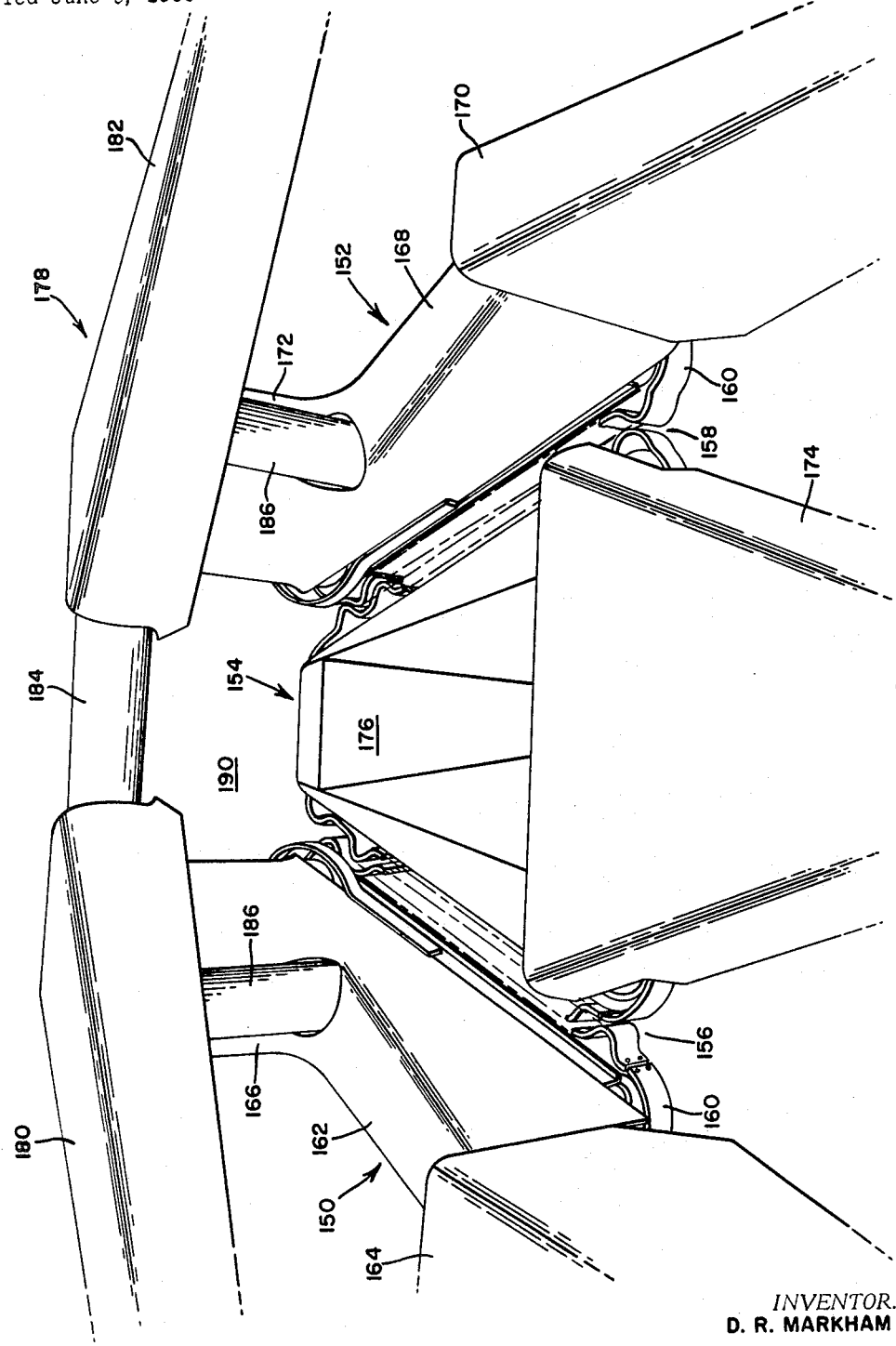
FIG. 4 is a perspective front view of a portion of a two-row type harvesting unit having the same novel features as the single row unit and including a slightly different embodiment of the upper stalk control means.

In FIG. 4 there is shown a two-row type harvesting unit having a slightly different embodiment of the upper stalk control and showing the unit equipped with an upright roller on both sides. The harvesting unit includes a pair of fore-and-aft members 150 and 152 and a fore-and-aft intermediate member 154, forming a pair of generally fore-and-aft passageways 156 and 158. A pair of gathering chains 160 is associated with each fore-and-aft passageway for engaging the stalks in adjacent rows as the machine advances and moving the stalks upwardly and rearwardly. The fore-and-aft member 150 includes a rear fender portion 162, a floating forward fender portion 164, and a rear abutment portion 166, and the fore-and-aft member 152 similarly includes a rear fender portion 168, a forward fender portion 170, and a rear abutment portion 172. The intermediate member 154 has a floating forward portion 174 and a deck portion 176 between the two sets of gathering chains 160. As the machine advances over a field of generally upright crops, the upper portions of the stalks are guided by an upper stalk control structure 178 including generally horizontal forwardly diverging guide members 180 and 182, respectively mounted above the fore-and-aft members 150 and 152, and a transverse member extending between the guide members 180 and 182 above and across the rear portions of the passageways 156 and 158. A generally upright roller 186 extends upwardly from each fore-and-aft member 150 and 152 immediately ahead of the abutment portions 166 and 172.

In operation the guide members 180 and 182 engage the upper portions of upright stalks in adjacent rows and converge the upper portions of the stalks as the gathering chains 160 move the stalks rearwardly and upwardly. The transverse member 184 engages the upper portions of the stalks to dispose the stalks in a generally fore-and-aft position as they are fed through the opening 190 by the feed rolls (not shown). The rear fender portions 162 and 168 have the same fender configuration as the previously described fender portion 68 to reduce the pull on downed stalks tending to pull the stalks from the gathering chains 160, and the rollers 186 can be either driven or free wheeling to perform the same function as the previously described roller 138.

Other features and advantages of the present invention will readily occur to those skilled in the art as will many modifications and alterations in the preferred embodiment of the invention described herein all of which may be achieved without departing from the spirit and the scope of the invention.

What is claimed is:

1. In a stalk crop harvesting unit including a frame adapted to advance over a field of row planted stalk crops, and provided with a pair of laterally spaced generally fore-and-aft members mounted on the frame and having an upwardly rearwardly inclined top surface, at least one elongated fore-and-aft passage between said fore-and-aft members adapted to receive the stalks as the machine advances over the field, a cutting means for severing stalks from the field, and gathering means for moving the severed stalks rearwardly along each passageway, the improvement comprising: a roller means rotatably mounted on and extending upwardly from the top surface of at least one fore-and-aft member adjacent a passageway for engaging downed stalks draped on the top surface of the fore-and-aft member while the stalks are being moved rearwardly by the gathering means.

2. The invention defined in claim 1 and including drive means operably connected to the roller means for rotating the roller means with its forward surface moving toward the adjacent passageway.

3. In a stalk crop harvesting unit including a frame adapted to advance over a field of row planted stalk crops and provided with fore-and-aft passage means, a cutting means below a forward part of the passage means for severing stalks from the field, and upwardly and rearwardly inclined gathering means for moving the severed stalks rearwardly along the passage means, the improvement comprising: a pair of laterally spaced fore-and-aft extending fender members mounted on the frame on opposite sides of the passage means and upwardly and rearwardly inclined at an angle lesser than that of the gathering means and having top surfaces elevated relative to the gathering means whereby the vertical distances between the gathering means and the top surfaces decrease rearwardly.

4. In a stalk crop harvesting unit including a frame adapted to advance over a field of row planted stalk crops, and provided with a pair of laterally spaced fore-and-aft members, a fore-and-aft passage means between said fore-and-aft members and including a front inlet and a rear outlet for accommodating stalks as the frame advances over the field, a cutting means adjacent to said inlet for severing the stalks from the field, gathering means for moving the severed stalks rearwardly along the passage means, and a pair of forward extension portions, one on each fore-and-aft member, extending forwardly beyond said inlet and diverging laterally outwardly and forwardly to free front ends spaced laterally apart a distance greater than the width of said inlet, the improvement residing in an upper stalk control means for guiding the upper part of upright stalks while the stalk is moving rearwardly along the passage means and including a pair of elongated generally horizontal, laterally spaced fore-and-aft guide members, mounted on a portion of the frame rearwardly of the cutting means and disposed in spaced relation to and above the fore-and-aft members on opposite side of the passage means and extending laterally outwardly and forwardly to terminal front ends substantially vertically aligned respectively with the free front ends of the aforesaid extension portions, and a transverse member mounted on the frame above and transversely across the passage means intermediate said inlet and outlet.

5. The invention defined in claim 4 further characterized by a pair of opposite laterally spaced inclined members respectively attached to and extending upwardly and rearwardly from the forward ends of the guide members.

6. The invention defined in claim 5 and including a deflector means extending between the transverse member and the guide members and between the inclined members and the guide members for preventing movement of the crop between the transverse member and the guide members and between the inclined members and the guide members.

7. A stalk crop harvesting unit comprising: a mobile frame adapted to advance over a field of stalk crops planted in rows; laterally spaced, generally fore-and-aft gathering members mounted on the frame defining an elongated fore-and-aft passageway adapted to receive the stalks of the crops in a row as the unit advances; a gathering means operatively associated with the passageway for moving the stalks rearwardly along the passageway, each gathering member including a relatively smooth upwardly and rearwardly inclined top surface elevated relative to the gathering means and adapted to slidably engage downed stalks as the machine advances; and a generally upright roller disposed above and extending upwardly from the top surface of at least one of the gathering members proximate to its rearward end and adapted to rotatably engage stalks after they move rearwardly over the top surface of the gathering member.

8. The invention defined in claim 7 wherein said upright roller extends upwardly from one of the gathering members and including drive means for rotating said roller so that its forward surface moves inwardly toward said passageway.

9. In a stalk crop harvesting unit including a frame adapted to advance over a field of row planted stalk crops, and provided with a pair of laterally spaced fore-and-aft members, a fore-and-aft passage means between said fore-and-aft members adapted to receive the stalks as the frame advances over the field, a cutting means below a forward part of the gathering means for severing the stalks from the field, gathering means for moving the severed stalks rearwardly along the passage means, the improvement residing in an upper stalk control means for guiding the upper part of upright stalks while the stalk is moving rearwardly along the passage means and including a pair of generally horizontal, laterally spaced fore-and-aft guide members mounted on the frame above the fore-and-aft members on opposite sides of the passage means and diverging forwardly, a transverse member mounted on the frame over and transversely across the passage means, and a generally upright roller means extending between a guide member and a rear part of the fore-and-aft member below the guide member for engaging downed stalks between the guide member and the fore-and-aft member while the stalks are being moved rearwardly by the gathering means.

References Cited

UNITED STATES PATENTS

| | | | |
|---|---|---|---|
| Re. 19,672 | 8/1935 | Malcom et al. | 171—61 X |
| 2,513,155 | 6/1950 | Dvorak | 56—64 |
| 2,651,162 | 9/1953 | Whisler | 56—1 |
| 3,271,940 | 9/1966 | Ashton et al. | 56—119 X |

ANTONIO F. GUIDA, *Primary Examiner.*